(12) United States Patent
Nalawadi et al.

(10) Patent No.: US 9,275,079 B2
(45) Date of Patent: Mar. 1, 2016

(54) METHOD AND APPARATUS FOR SEMANTIC ASSOCIATION OF IMAGES WITH AUGMENTATION DATA

(75) Inventors: Shailesh Nalawadi, Morgan Hill, CA (US); Hartmut Neven, Malibu, CA (US); Hartwig Adam, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 223 days.

(21) Appl. No.: 13/151,626

(22) Filed: Jun. 2, 2011

(65) Prior Publication Data

US 2015/0169987 A1    Jun. 18, 2015

(51) Int. Cl.
*G06F 17/30* (2006.01)
*G06K 9/00* (2006.01)

(52) U.S. Cl.
CPC ...... *G06F 17/3028* (2013.01); *G06F 17/30247* (2013.01); *G06K 9/00671* (2013.01)

(58) Field of Classification Search
None
See application file for complete search history.

(56) References Cited

U.S. PATENT DOCUMENTS

| 6,690,516 | B2 | 2/2004 | Aritake et al. | |
|---|---|---|---|---|
| 2002/0047867 | A1* | 4/2002 | Mault et al. | 345/810 |
| 2008/0267504 | A1* | 10/2008 | Schloter et al. | 382/181 |
| 2011/0213664 | A1* | 9/2011 | Osterhout et al. | 705/14.58 |

OTHER PUBLICATIONS

Diaz, Jesus. "Sixth Sense Technology May Change How We Look at the World Forever." Gizmodo. N.p., Mar. 10, 2009. Web. Mar. 13, 2013. < http://gizmodo.com/5167790/sixth-sense-technology-may-change-how-we-look-at-the-world-forever>.*

* cited by examiner

*Primary Examiner* — Maurice L McDowell, Jr.
*Assistant Examiner* — Raffi Isanians
(74) *Attorney, Agent, or Firm* — Fish & Richardson P.C.

(57) ABSTRACT

A method and apparatus for enabling semantic association of images with augmentation data is described. The method may include receiving digital image data captured by a mobile device. The method may also include performing image recognition analysis on an object within the digital image data to identify the object. The method may also include querying a semantic associations database based on a determined identify of the object to determine a secondary meaning associated with the object, and transmitting augmentation data to the mobile device that is semantically relevant to the object based on the secondary meaning.

14 Claims, 11 Drawing Sheets

METHOD AND APPARATUS FOR SEMANTIC ASSOCIATION OF IMAGES WITH AUGMENTATION DATA

TECHNICAL FIELD

Embodiments of the invention relate to the field of augmenting reality, and more particularly, to augmenting reality with semantically relevant data for objects in image data.

BACKGROUND

The internet provides a vast amount of knowledge about people, places, and things. Users utilize search engines to cull through the vast array of available knowledge when they want detailed information about a particular person, place, or thing. Mobile devices may be utilized to access the internet and conduct searches from anywhere. For example, when a user is standing next to a historical landmark, he or she may search historical data for the landmark, photos relevant to the landmark, etc. A search engine returns results to the user based on the query by locating relevant content that was found by the search engine via a web crawl.

SUMMARY

A method and apparatus for enabling semantic association of images with augmentation data is described. According to an exemplary method, digital image data captured by a mobile device is received. In one embodiment, image recognition analysis is performed on an object within the digital image data to identify the object. In one embodiment, a semantic associations database is queried based on a determined identify of the object to determine a secondary meaning associated with the object. In one embodiment, augmentation data, which is semantically relevant to the object based on the secondary meaning, is transmitted to the mobile device.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
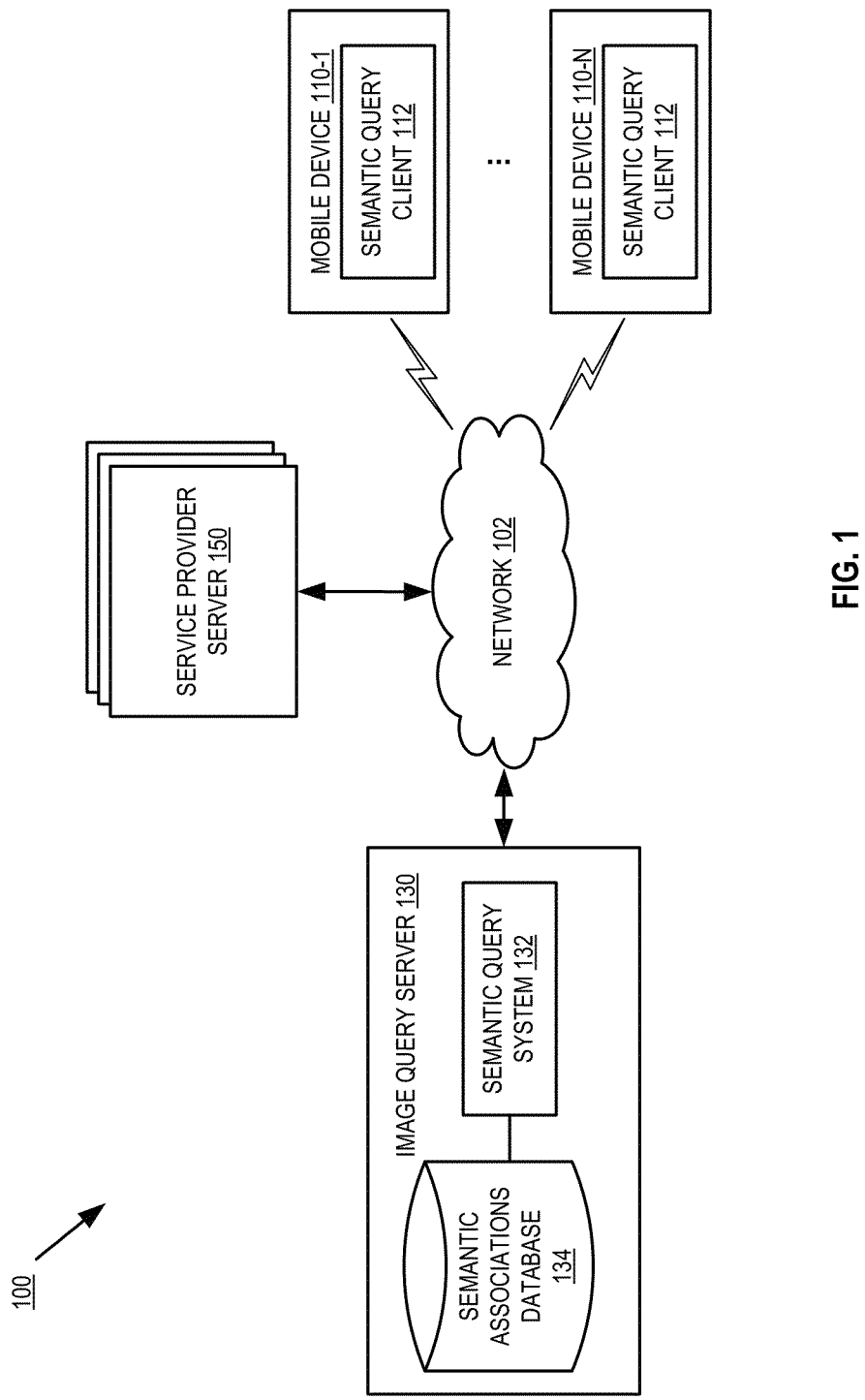
FIG. 1 is a block diagram of exemplary system architecture for enabling the semantic association of augmentation data with image data.

In the following description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "performing", "querying", "transmitting", "requesting", "including", "consulting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus.

Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

FIG. 1 is a block diagram of exemplary system architecture 100 for augmenting reality with semantically relevant data for objects in image data. In one embodiment, the system 100 includes a plurality of mobile devices, such as mobile device 110-1 to mobile device 110-N, an image query server 130, and one or more service provider systems 150. In one embodiment, mobile device 110 may be a mobile computing device, such as a mobile telephone, personal digital assistant, tablet computer, wearable computing device, etc. The image query server 130 and service provider systems 150 may also be computing devices, such as a server computers, desktop computers, etc.

The mobile devices 110, image query server 130, and service provider systems 150 may be coupled to a network 102 that communicates any of the standard protocols for the exchange of information. In one embodiment, mobile devices 110 are coupled with network 102 via a wireless connection, such as a cellular telephone connection, wireless fidelity connection, etc. The mobile devices 110, image query server 130, and service provider systems 150 may run on one Local Area Network (LAN) and may be incorporated into the same physical or logical system, or different physical or logical systems. Alternatively, the mobile devices 110, image query server 130, and service provider systems 150 may reside on different LANs, wide area networks, cellular telephone networks, etc. that may be coupled together via the Internet but separated by firewalls, routers, and/or other network devices. In yet another configuration, the image query server 130 may reside on the same server, or different servers, coupled to other devices via a public network (e.g., the Internet) or a private network (e.g., LAN). It should be noted that various other network configurations can be used including, for example, hosted configurations, distributed configurations, centralized configurations, etc.

Figure 9:
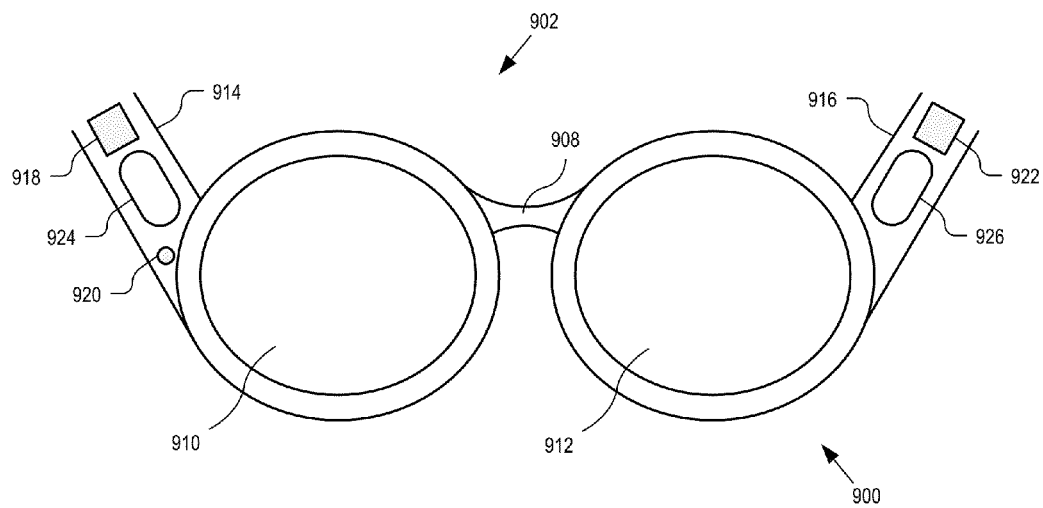
FIG. 9 illustrates an example system for receiving, transmitting, and displaying semantically relevant data.
Figure 10:
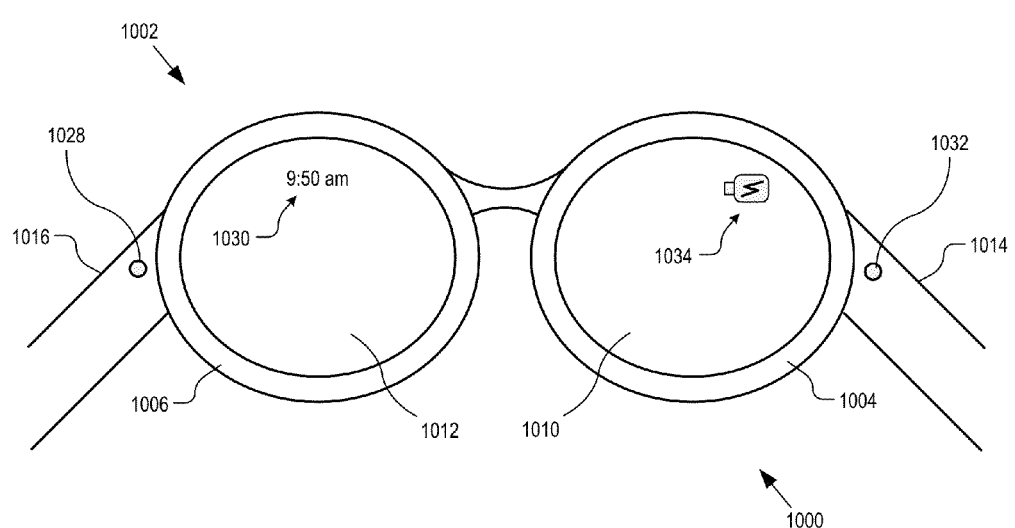
FIG. 10 illustrates an alternate view of an example system for receiving, transmitting, and displaying semantically relevant data.

The mobile devices 110 are responsible for capturing digital image data with a digital camera (not shown) of the mobile device. In one embodiment, the digital image data may include still digital photographs, a series of digital photographs, recorded digital video, a live video feed, etc. In one embodiment, a mobile device 110 may be a cellular communication enabled wearable device as illustrated in FIGS. 9 and 10, as well as cellular telephones, tablet computers, etc.

In one embodiment, digital image data may capture real-world objects such as places or things, as well as people. In one embodiment, when a mobile device, such as mobile device 110-1, captures digital image data, the semantic query client 112 of the mobile device may additionally display semantically relevant augmentation data over the objects and/or people captured within the digital image data. In one embodiment, data is semantically relevant to an object when the data is related to the object beyond that of a literal relationship. The semantic relationship between an object and a secondary meaning (i.e., a meaning or relationship that is non-literal), may be based on societal customs, cultural norms, common gestures, etc. In one embodiment, as discussed in greater detail below, face recognition, visual search, as well as other image matching methods, may be utilized to identify specific people or things within digital image data. Based on the identified people or objects within digital image data, semantically relevant augmentation data associated with the recognized people or objects can be rendered over the digital image data displayed by a mobile device 110.

In one embodiment, when mobile device 110-1 captures digital video, a live video feed, digital images, etc., semantic query client 112 transmits the digital image data to image query server 130. In one embodiment, a semantic query system 132 of image query server 130 receives the digital image data and responds with semantically relevant augmentation data, as discussed below.

In one embodiment, when semantic query system 132 of image query server 130 receives digital image data from a semantic query client 112, semantic query system 132 performs one or more image recognition processes on the digital video. In one embodiment, semantic query system 132 performs image matching on objects within the video. In one embodiment, semantic query system 132 performs object recognition in order to identify specific objects within a video (e.g., digital image data contains an image of a wrist, the sky, a plate of food, a storefront, etc.).

In one embodiment, when semantic query system 132 identifies an object, based on one or more image recognition processes, semantic query system 132 queries semantic associations database 134 to determine if there are any secondary meanings associated with the identified object. For example, when image data captures an image of a user's wrist, the secondary meaning associated a wrist could indicate that a user is interested in the current time. As another example, when image data captures an image of the sky, the secondary meaning associated with the sky could indicate that a user is interested in the weather. The semantic associations between objects and secondary meanings associated with the objects enables augmentation data to be provided to mobile devices 110 that goes beyond the literal meaning that can be derived from recognizing an object in digital image data. That is, the semantically relevant data provides a user with data that they might naturally associate with an object, gesture, etc. based on cultural norms, societal meanings, common practice, and which would not be found based on a literal search of a recognized object. Continuing the example above, a conventional search system would obtain data for a wrist, such as wrist injury information, encyclopedia results describing a human wrist, etc. These results, though relevant to a wrist, do not provide a user with data they may actually desire, such as a current time when a camera is pointed at a wrist, much as a person would look at a watch on their wrist to determine the time.

In one embodiment, the semantic associations between objects and secondary meanings stored in semantic associations database 134 indicate that the semantically relevant augmentation data should be obtained from a service provider systems 150. That is, semantic query system 132 may recognize an object in digital image data and determine a secondary meaning associated with the object, but may not necessarily store the semantically relevant data. In one embodiment, the determined secondary meaning may indicate a source, such as service provider system 150, where the semantically relevant augmentation data may be obtained. Continuing the example above, when semantic query system 132 determines that a user has captured digital image data of the sky, semantic associations database 134 may indicate that the secondary meaning associated with an image of the sky is a user request for the weather. In one embodiment, semantic query system 132 would request the current weather data from a weather service provider via network 102.

In one embodiment, when semantic query system 132 obtains the semantically relevant augmentation data, semantic query system 132 provides the augmentation data to semantic query client 112. In one embodiment, where mobile device 110 has captured a still image, semantic query client renders the semantically relevant augmentation data over a location in the image appropriate to the recognized object. In one embodiment, where a mobile device 110 is capturing video data, semantic query client 112 tracks the movement of identified objects within a video displayed on a mobile device 110. The tracked location data is then utilized by semantic query client 112 to render the semantically relevant augmentation data at locations within the video that are appropriate for each identified person or object.

In one embodiment, where a mobile device 110 that displays semantically relevant augmentation data is a user-wearable computing system in the form of eyeglasses, as illustrated in FIGS. 9 and 10, the mobile device 110 digitally paints a lens of the glasses so that an image of the augmentation data is reflected back into the eye of a user. In one embodiment, a lens of the user-wearable computing system may be painted utilizing the methods discussed herein for augmenting video and images so that a user sees the semantically relevant augmentation data in their field of view, rather than in a video. For example, a user wearing a computing system that views a bus through the glasses illustrated in FIGS. 9 and 10 may have semantically relevant augmentation data, such as a bus schedule, associated with the bus painted on a lens of the glasses. The semantically relevant augmentation data is then reflected back into the eye of the user/wearer, so that the user's view of the object through the glasses is augmented with semantically relevant data.

Figure 2:
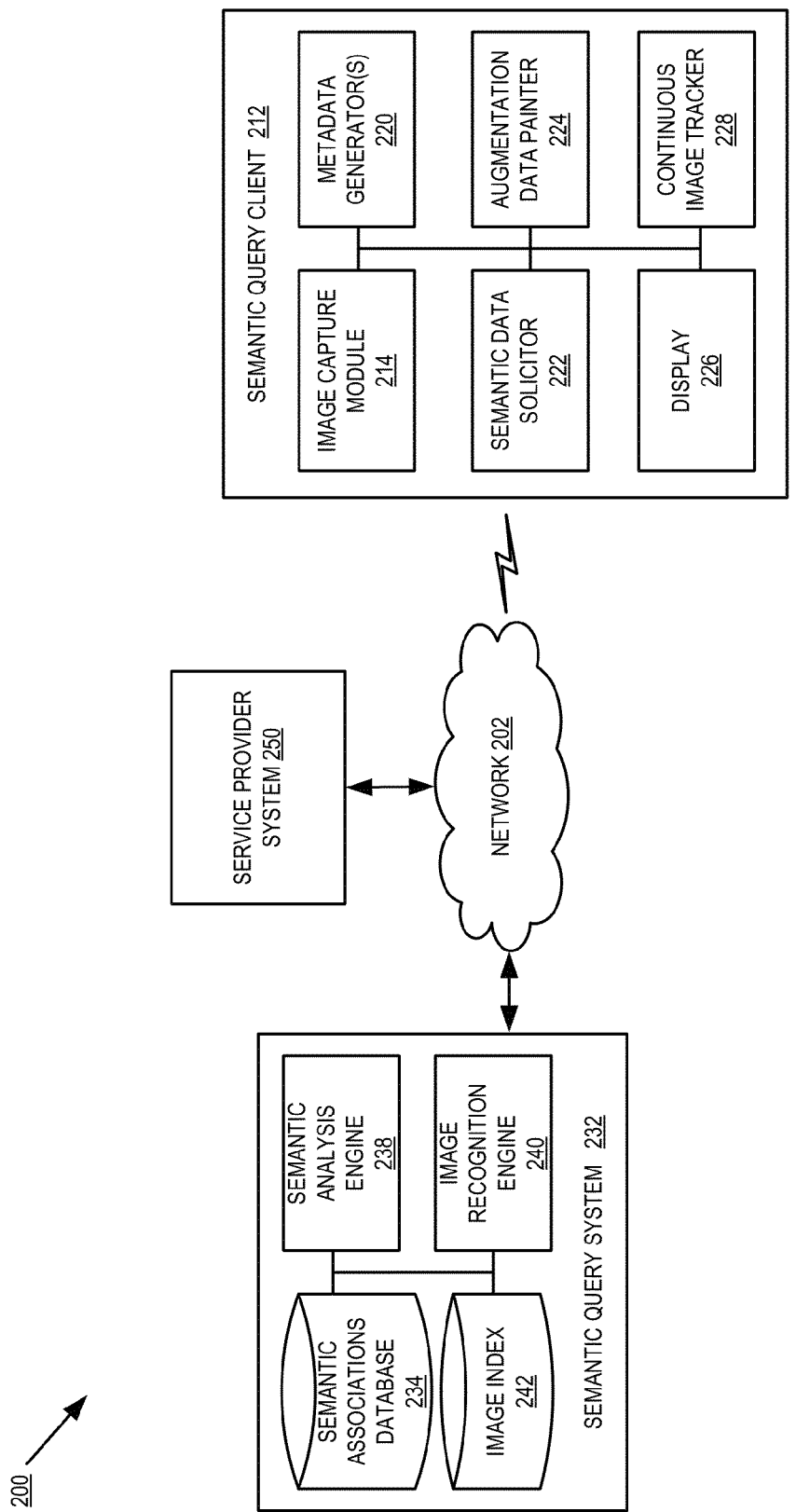
FIG. 2 is a block diagram of one embodiment of a semantic query system and a semantic query client.

FIG. 2 is a block diagram of one embodiment 200 of a semantic query system and a semantic query client. Semantic query client 212 and semantic query system 232 provide additional details for the semantic query clients 112 and semantic query system 132 discussed above in FIG. 1.

In one embodiment, semantic query client 212 may include an image capture module 214, one or more metadata generators 220, a semantic data solicitor 222, an augmentation data painter 224, a continuous image tracker 228, and a display 226. In one embodiment, semantic query system 232 may include an image recognition engine 240, a semantic analysis engine 238, a semantic associations database 234, and an image index 242. In one embodiment, the semantic query client 212 and semantic query system 232 communicate with each other over various networks 202 and network configurations as discussed above in FIG. 1.

In the semantic query client 212, image capture module 214 is responsible for capturing digital image data that may contain people or objects within the real world. The digital image data may include live video feeds or recorded videos, as well as still digital images. In one embodiment, image capture module 214 is a digital camera of a mobile device. In one embodiment, in response to the capture of digital image data by image capture module 214, metadata generators capture one or more forms of sensor data while image data is captured by image capture module 214. The metadata generators 220 may include sensors that generate global positioning system (GPS) data, orientation data, compass data, accelerometer data, level sensing data, pressure data, ambient light data, auditory data, as well as other forms of sensor data. In one embodiment, the metadata generated by metadata generators 220 provides additional context data relevant to image data, and aids in semantic analysis engine's 238 determination of a secondary meaning, as discussed below. For example, orientation metadata may indicate that a mobile device is pointed upwards when an image was captured, GPS metadata may indicate a specific geographic location where an image was captured, accelerometer data may indicate that a user is moving when an image was captured, ambient light data may indicate that digital image data is captured during the day or night, as well as indoors or outdoors, etc. In one embodiment, in response to the capture of digital image data, semantic data solicitor 222 transmits the digital image data, and metadata, to semantic query system 232.

In response to receipt of the digital image data, image recognition engine 240 performs one or more image matching processes on the digital image data. In one embodiment, image recognition engine 240 performs image recognition analysis on the digital image data to attempt to identify objects within the digital image data. In one embodiment, as discussed below, image recognition engine 240 generates feature vectors for objects within the received digital image data. In one embodiment, the feature vectors provide a digital signature that is virtually unique for the objects from which they are extracted from. Then, image recognition engine 240 searches the image index 242 utilizing the generated feature vectors in order to determine whether there is a match between an indexed image and an object in the digital image data.

In one embodiment, image recognition engine 240 informs semantic analysis engine 238 when an object has been identified. In one embodiment, semantic analysis engine 238 utilizes the identity of the matched object to query semantic associations database 234 to determine whether a secondary meaning is associated with the recognized object. In one embodiment, semantic analysis engine 238 further utilizes sensor data, received from semantic query client, to distinguish between multiple potential secondary meanings, or otherwise refine a matched object's secondary meaning. As discussed above, a secondary meaning may be associated with an object based on societal meaning, cultural norms, a secondary meaning mined from data available on the internet, mined from image captions, etc. For example, it is a generally accepted practice that looking at one's wrist or pointing to one's wrist likely indicates that one is interested in the current time. Thus, a secondary meaning associated with a picture of a wrist can be associated with a request to know the current time. As another example, looking up at the sky may indicate that a person is determining the current weather condition. As yet another example, when a significant percentage of pictures available on the Internet or photo sharing websites that include pictures of women in white dresses include captions involving weddings, it can be inferred that when a user views a woman in a white dress, they may want information on weddings. In one embodiment, semantic associations database 234 stores the secondary meaning associations with objects in a translation table.

In one embodiment, the secondary meaning associated with an object and stored in semantic associations database 234, further indicates a remote system, such as service provider system 250, where the semantically relevant data may be obtained. In one embodiment, semantic analysis engine 238 queries the service provider system 250 to obtain the semantically relevant data related to the recognized object based on the secondary meaning. In one embodiment, semantic analysis engine 238 includes the metadata from metadata generators 220 in the request to provide additional context to the request. For example, semantic analysis engine 238 could query a weather service to obtain augmentation data in response to recognition of an image of the sky. Furthermore, the query could include GPS data that indicates the image data was captured in Mountain View, Calif. Semantic analysis engine 238 then obtains semantically relevant data that is also relevant to the current and specific conditions associated with a user. As another example, semantic analysis engine 238 could query a restaurant review system to obtain restaurant reviews of a chain restaurant at or near a particular location, query a time server to obtain the current time in the user's time zone, etc. Semantic analysis engine 238 then provides the obtained semantically relevant augmentation data to the semantic data solicitor 222.

In one embodiment, the received semantically relevant augmentation data is provided to augmentation data painter 224 and continuous image tracker 228. In one embodiment, continuous image tracker 228 determines the location of the identified object within the image or video being captured by image capture module 214. In one embodiment, when the digital image data is a video, continuous object tracker 228 tracks pixels in the video of the object, a bounding box around the object, etc. Continuous object tracker 228 provides the location data to augmentation data painter 224.

In one embodiment, augmentation data painter 224 receives the location data and renders the received semantically relevant augmentation data over the digital image data. In one embodiment, the location data is utilized to render the semantically relevant augmentation data over a location in the digital image data relative to the identified object. In another embodiment, augmentation data painter 224 utilizes the location data to paint a lens of a user-wearable computer system to augment the appropriate location of a field of view of a user.

Figure 5A:
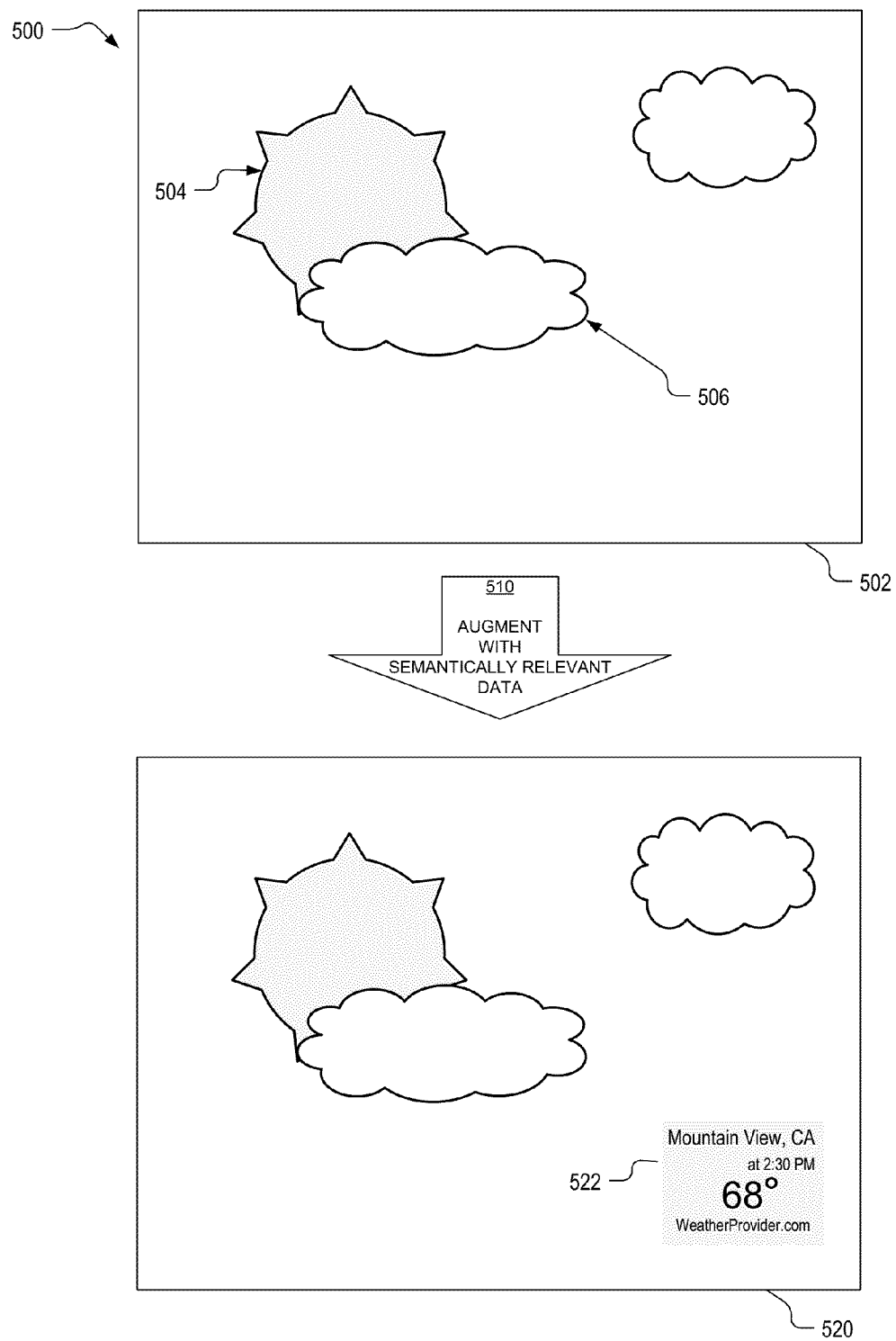
FIG. 5A illustrates an example display of a digital image data and digital image data augmented with semantically relevant data.

FIG. 5A illustrates an example display 500 of a digital image data 502 and digital image data 520 augmented with semantically relevant data, as discussed herein. The digital image data 502 is captured by a mobile device, such as a wearable computing device (e.g., FIGS. 9 and 10), a cellular phone, a tablet computer, etc. In the exemplary digital image data 502, a picture or video of the sky 502 is captured within the digital image data. It may be determined that this is an image of the sky because the digital image data includes a picture of the sun 504, clouds 506, and may include metadata indicating that a camera was pointed upwards when the image data was captured. In one embodiment, the image data 502 is transmitted to a semantic query system 232 by a semantic query client 212 as discussed above. When the image is recognized as an image of the sky by semantic query system 232, semantic query system 232 obtains semantically relevant augmentation data. As discussed herein, semantic query system 232 may issue a query to a service provider system in order to obtain the augmentation data. Semantic query system 232 then provides the semantically relevant augmentation data to the semantic query client 212.

In one embodiment, semantic query client 212 paints 510 the received semantically relevant augmentation data over the digital image data of the sky. In digital image data 520, exemplary weather 522 is displayed in a box within the digital image data. In one embodiment, the weather data is semantically related to the picture of the sky, and relevant to a current location of a user. As discussed above, the current location of the user may be determined from sensor metadata received from a mobile device, and utilized by semantic query system 232 when requesting the augmentation data.

Figure 5B:
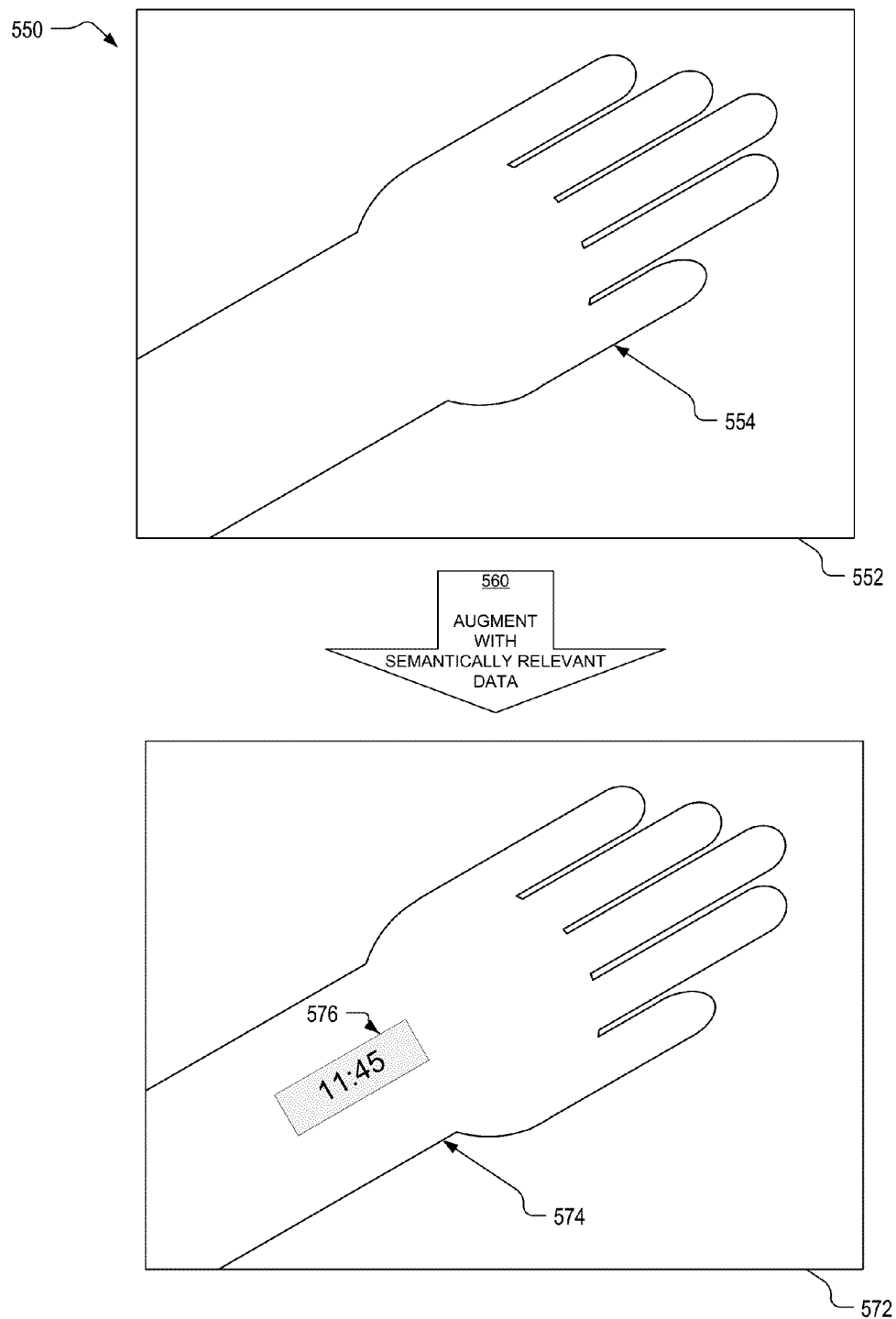
FIG. 5B illustrates an example display of a digital image data and digital image data augmented with semantically relevant data.

FIG. 5B illustrates another example display 550 of a digital image data 552 and digital image data 572 augmented with semantically relevant data, as discussed herein. The digital image data 552 of a hand and wrist 554 is captured by a mobile device, and transferred from a semantic query client 212 to a semantic query system 232. A semantic analysis system 238 may determine that because the image includes a hand and wrist, a user operating a camera may be interested in the current time. This may be determined when an image of the wrist is associated with a secondary meaning that indicates an image of a wrist is associated with a request to know the current time. As discussed herein, semantic query system 232 may issue a query to a service provider system, such as the National Institute of Standards and Technology Time Server, in order to obtain the augmentation data. Semantic query system 232 then provides 560 the semantically relevant augmentation data to the semantic query client 212.

In one embodiment, semantic query client 212 paints the received semantically relevant augmentation data (e.g., the current time) over the digital image data 572 of the wrist 574. In digital image data 572, the current time 576 is displayed in a box at a location within digital image data 572 over the wrist 574. As discussed above, the current location of the user, and thus the specific time zone, may be determined from sensor metadata received from a mobile device, and utilized by semantic query system 232 when requesting the augmentation data.

Figure 3:
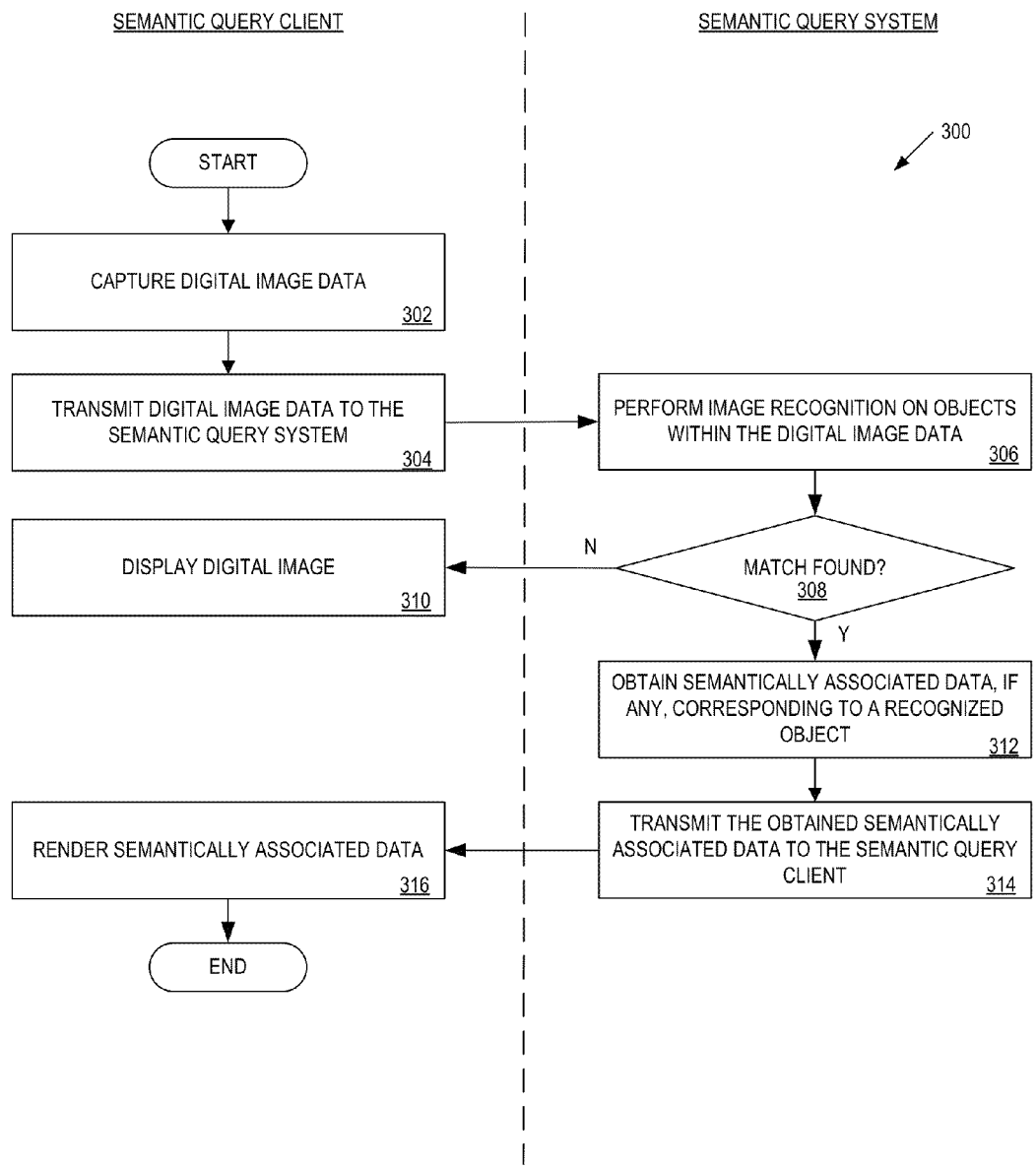
FIG. 3 is a flow diagram of one embodiment of a method for augmenting digital image data with semantically relevant augmentation data.

FIG. 3 is a flow diagram of one embodiment of a method 300 for augmenting digital image data with semantically relevant data for objects in the image data. The method 300 is performed by processing logic that may comprise hardware (circuitry, dedicated logic, etc.), software (such as is run on a general purpose computer system or a dedicated machine), firmware, or a combination. In one embodiment, the method 300 is performed by a semantic query client and a semantic query system (e.g., semantic query client 112 or 212, and semantic query system 132 or 232).

Referring to FIG. 3, processing logic begins by capturing digital image data (processing block 302). In one embodiment, a mobile device, such as a cellular telephone, tablet computer, wearable processing system, etc., captures the digital image data with a camera of the mobile device. The digital image data may be a live video feed, a recorded video feed, a still digital photograph, etc. In one embodiment, the digital image data captures real-world objects including people. In one embodiment, processing logic captures the digital image in response to a user pro-actively capturing the digital image, such as by pointing a camera of the mobile device at an object, framing the object in a display of the digital image, initiating the digital image capture, etc. In another embodiment, processing logic captures the digital image when the camera is pointed at the object, but without the intervention of a user. For example, the digital camera of a mobile device may be pointed at an object with or without display of a corresponding digital image of the object to a user. In this example, a digital camera could capture images of the objects in a field of view of the camera periodically, and without a user request to capture the images, while the user blindly points the digital camera in various directions and at various objects.

Processing logic transmits the digital image data to the semantic query system (processing block 304). In one embodiment, processing logic also transmits a query to semantic query system for semantically relevant augmentation data associated with objects and/or people in the digital image data. In another embodiment, the query for semantically relevant augmentation data is implicit in the digital image data transfer to the semantic query system.

Processing logic performs image recognition on objects within the digital image data (processing block 306). In one embodiment, and as discussed in greater detail below, processing logic generates a digital signature for the objects within the digital video. In one embodiment, the digital signatures are generated by the semantic query system from the received digital image data. In another embodiment, the digital signatures are generated by the semantic query client and transmitted to semantic query system instead of the digital image data. In either embodiment, processing logic utilizes the digital signature(s) to search an index of digital images (processing block 308). When there is not a match within the index for the objects, processing logic displays the digital image data on the mobile device without rendering any semantically relevant data over the digital image data (processing block 310).

However, when a match is found in the digital image index, and thus an object within the digital image data has been identified, processing logic obtains semantically relevant data, if any, associated with the recognized object (processing block 312). As discussed above, the semantically relevant data is data that has a secondary and non-literal relationship with the matched object in the digital image data. For example, a current time is semantically relevant to a digital image that includes a wrist, whereas a medical reference for a wrist is literally relevant to the image of the wrist. The obtained semantically relevant data is transmitted to the semantic query client (processing block 314).

Processing logic displays the semantically relevant data (processing block 316). In one embodiment, the display of the semantically relevant data is rendered over a display of the digital image data. In one embodiment, semantically relevant data queries are issued, and semantically relevant data obtained, in near real time to enable the augmentation of still image data as well as live video feeds. For example, a user taking video by panning a cellular telephone can instantly view the video augmented with semantically relevant data. As another example, a user wearing a wearable processing device, such as the glasses 900 and 1000 illustrated in FIGS. 9 and 10, is able to immerse himself in an environment where the user's field of view of the real world is augmented with semantically relevant data. That is, semantically relevant data obtained in near real time from a camera of glasses 900 and 100, is painted by a semantic query client of glasses 900 and 1000 onto the lens of glasses 900 and 1000, or eye of a user of glasses 900 and 1000, to augment the user's field of view. In another embodiment, the semantically relevant data is rendered on a display of a mobile device by processing logic without augmenting digital image data. In this embodiment, instead of superimposing the semantically relevant data over a display of the captured digital image, the semantically relevant display data is rendered to a user independently of the digital image to inform the user of the semantically relevant data.

Figure 4:
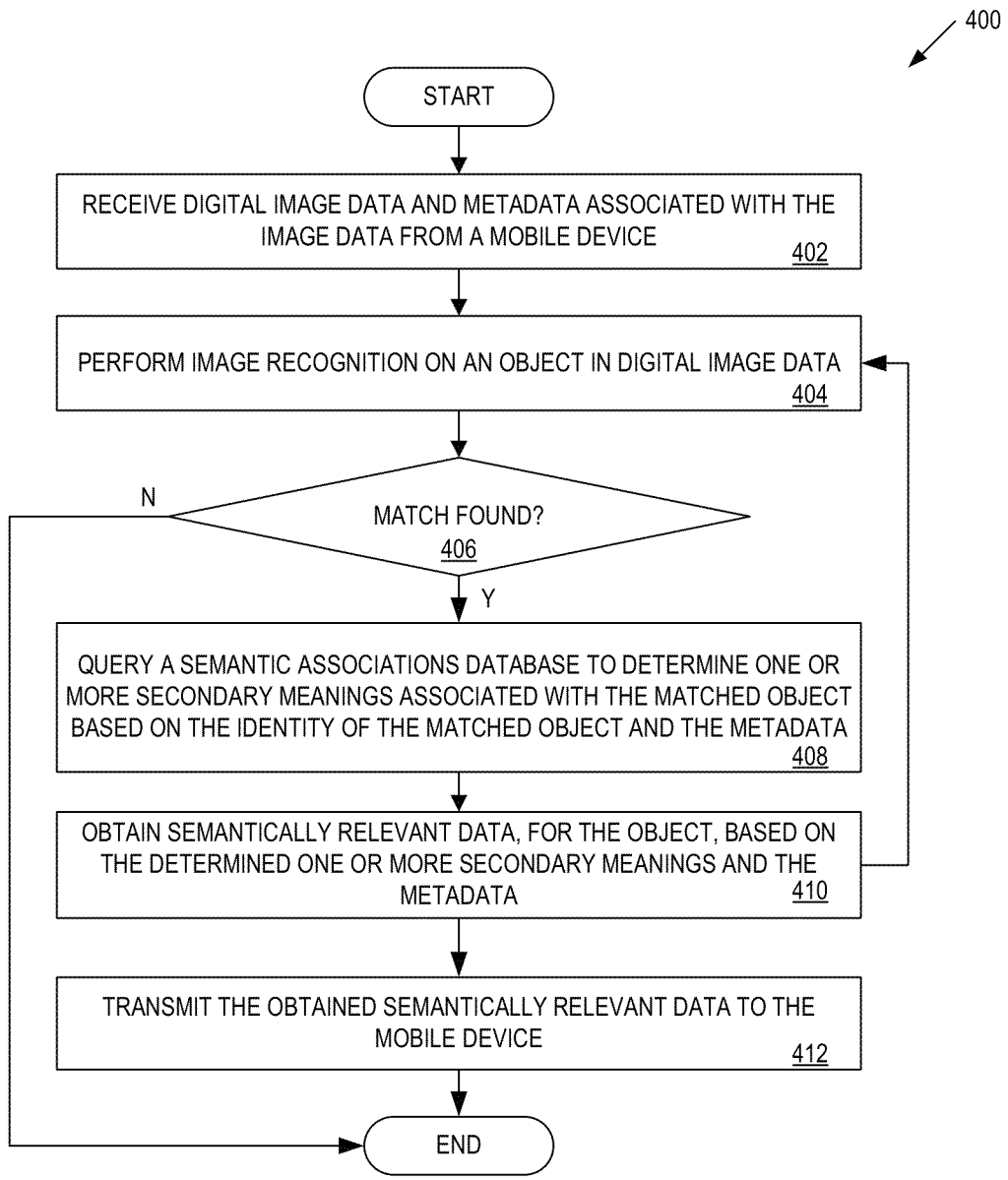
FIG. 4 is a flow diagram of one embodiment of a method for obtaining semantically relevant augmentation data.

FIG. 4 is a flow diagram of one embodiment of a method 400 for obtaining semantically relevant data for objects within digital image data. The method 400 is performed by processing logic that may comprise hardware (circuitry, dedicated logic, etc.), software (such as is run on a general purpose computer system or a dedicated machine), firmware, or a combination. In one embodiment, the method 400 is performed by a semantic query system (e.g., semantic query system 132 or 232).

Referring to FIG. 4, processing logic begins by receiving digital image data and metadata associated with the image data from a mobile device (processing block 402). As discussed above, the digital image data may include still digital images, recorded digital video, a live video feed, etc. Furthermore, in one embodiment, the digital image data includes sensor metadata generated by the mobile device. For example, the sensor metadata may include location data generated by a GPS unit, orientation data determined from one or more accelerometers, a pressure reading from a pressure sensor, ambient light sensor data, direction data obtained from a compass, etc. In one embodiment, the sensor metadata is generated by the mobile device when the digital image data is captured in order to provide further context to the digital image data, and to aid in the acquisition of semantically relevant augmentation data, as discussed below.

In one embodiment, processing logic performs image recognition on an object in the digital image (processing block 404). The image recognition performed by processing logic is discussed more fully below in FIG. 6. Processing logic then determines whether there is a match for the object (processing block 406). In one embodiment, a match identifies the object (e.g., a wrist, the sky, a storefront, a wedding ring, etc.) to processing logic. When there is no match for the objects within the digital image data, the process ends.

When there is a match for the object in the digital image data, processing logic queries a semantic associations database to determine one or more secondary meanings associated with the matched object (processing block 408). In one embodiment, the secondary meanings are determined from the identity of the matched object and the metadata. In one embodiment, processing logic queries a translation table that associates objects with their secondary meanings. In one embodiment, an object may have more than one secondary meaning, since objects may be associated with different cultural norms, mined societal meanings, as well as other semantic associations. For example, digital image data that contains a picture of the sky could be associated with multiple secondary meanings, such as the weather and astrology.

Processing logic obtains the semantically relevant data, for the object, based on the determined one or more secondary meanings and the sensor metadata (processing block 410). In one embodiment, processing logic queries a remote system, such as a weather service, time server, search system, etc., to obtain the semantically relevant data based on the determined secondary meaning. In one embodiment, the sensor data is included in the query for the semantically relevant data to provide further context to the query. That is, the sensor data enables processing logic to issue a more specific query, and thus receive a more precise result, for the semantically relevant data. For example, a request for the current weather may include GPS data so that the request is appropriate for the real world location of a user. As another example, a request for the current time may also include GPS data so that the time is displayed for the appropriate time zone. Additional sensor data, such as orientation, direction (i.e., compass), etc. data may also be utilized to refine the results obtained for a user. Processing logic then transmits the obtained semantically relevant data to the mobile device (processing block 412).

Figure 6:
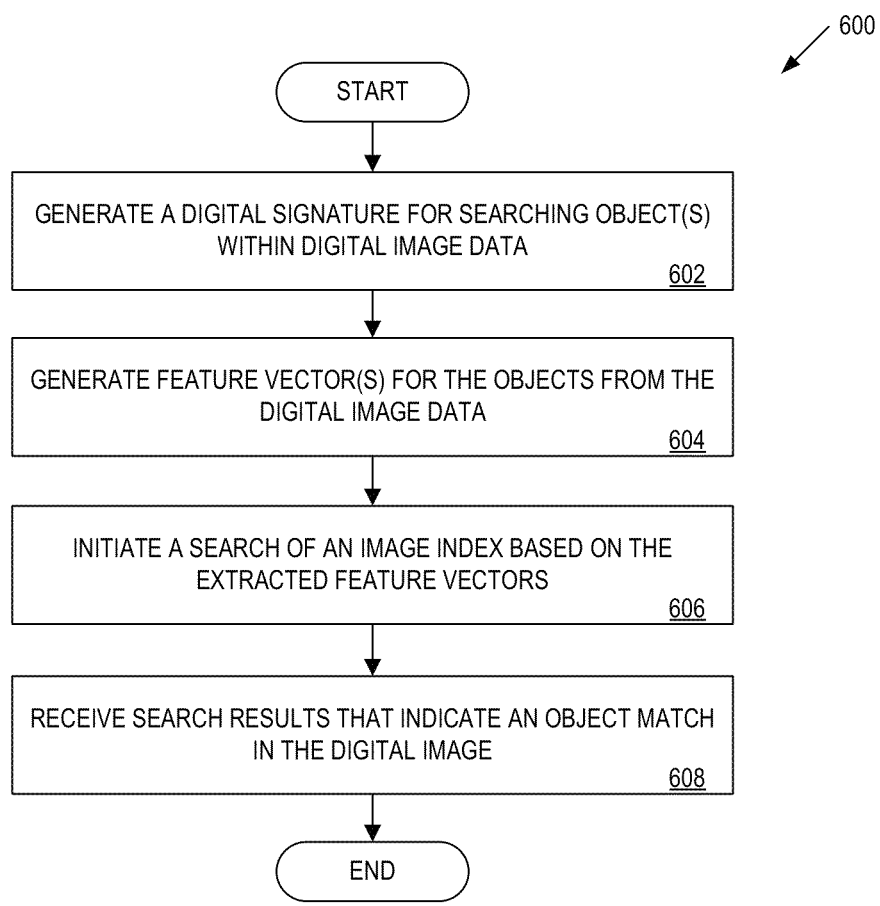
FIG. 6 is a flow diagram of one embodiment of a method for performing image recognition on objects in digital image data.

FIG. 6 is a flow diagram of one embodiment of a method 600 for performing image recognition on objects in a digital video. The method 600 is performed by processing logic that may comprise hardware (circuitry, dedicated logic, etc.), software (such as is run on a general purpose computer system or a dedicated machine), firmware, or a combination. In one embodiment, the method 500 is performed by a semantic query system (e.g., semantic query system 132 or 232).

Referring to FIG. 6, processing logic begins by generating a digital signature for one or more objects within digital image data (processing block 602). As discussed above, a digital video, live video feed, still digital image, series of digital images, etc. is captured by a mobile device and transmitted to a semantic query system. In one embodiment, for digital video, the digital video itself may be transferred to the semantic query system, or individual frames extracted from the video may be transferred to the semantic query system at periodic intervals. Processing logic receives the digital image data from the mobile device in order to locate objects within the video that have a secondary meaning, and thus semantically relevant data is available.

Processing logic generates one or more feature vectors for the objects from the digital image data (processing block 604). In one embodiment, the digital signature is made of the one or more feature vectors extracted from the digital image data that includes the objects. The feature vector describes an image based on interest points within the image. In one embodiment, the interest points that are selected for the feature vector describe the object such that they can be reliably found again in other digital images or videos of the real-world object. For example, the interest points can be corners, blobs, changes in contrast, or other high gradient points, as opposed to continuous tone regions of an image of the real-world object. In one embodiment, these points are utilized to create the feature vector to describe the pixels around the points of the image. The image of the real-world object (e.g., a face, tattoo, the sky, a storefront, a wrist, etc.), and thus the real-world object, is characterized by the one or more feature vectors.

Processing logic initiates a search of an image index based on the extracted feature vectors (processing block 606). In one embodiment, images cataloged by the image index are arranged in, for example, a k-dimensional tree structure. The arrangement of feature vectors enables a nearest-neighbor based search of feature vectors in order to locate a match for the extracted feature vectors.

Search results may then be received that indicate an object within the digital image data matches an entry in the image index (processing block 608). In one embodiment, the match is indicative of an identity of an object within the digital image data. Thus, in one embodiment, the known identity may then be utilized to locate one or more secondary meanings that are associated with the identified object, as discussed above.

Figure 7:
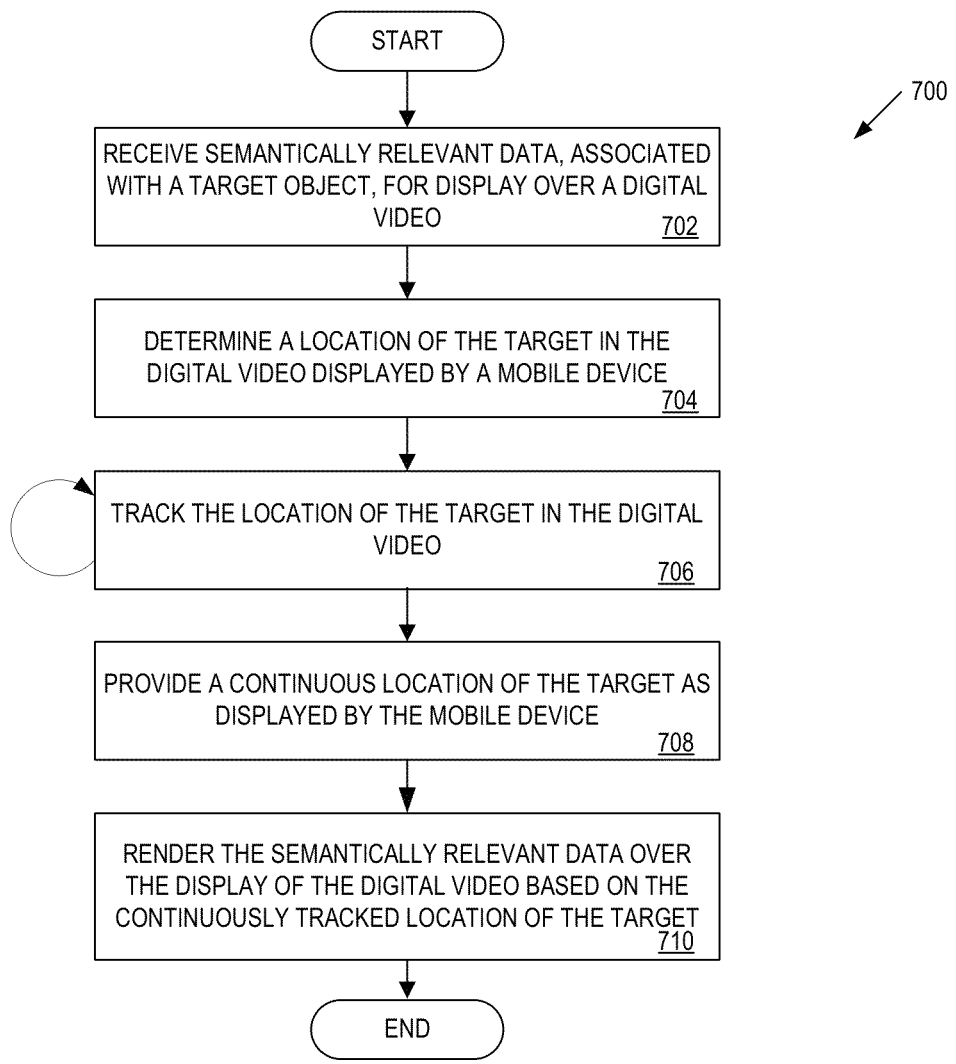
FIG. 7 is a flow diagram of one embodiment of a method for continuously tracking real-world objects in digital image data.

FIG. 7 is a flow diagram of one embodiment of a method 700 for continuously tracking real-world objects in digital videos. The method 700 is performed by processing logic that may comprise hardware (circuitry, dedicated logic, etc.), software (such as is run on a general purpose computer system or a dedicated machine), firmware, or a combination. In one embodiment, the method 700 is performed by a semantic query client (e.g., semantic query client 112 or 212).

Referring to FIG. 7, processing logic begins by receiving semantically relevant data, associated with a target object, for display over a digital video (processing block 702). In one embodiment, a camera of a mobile device has either captured a digital video that contains the object, or is capturing a live video feed that contains the real-world object. When the object is matched in a digital image index, the associated secondary meaning is determined and semantically relevant data is provided to the mobile device, as discussed above.

Processing logic determines a location of the target in the digital video being displayed by the mobile device (processing block 704). In one embodiment, processing logic locates trackable pixels within the digital video, a bounding box around the person or object in the digital video, etc. Processing logic may then utilize this location data, as described below, to render semantically relevant data over a digital video at the appropriate location relative to the matched object within the video.

Based on the selected pixels, bounding box, etc., processing logic tracks the location of the target in the digital video (processing block 706). Processing logic provides the continuous location of the target in the display of the mobile device to a rendering system (processing block 708). The semantically relevant data is then rendered over the display of the digital video based on the continuously tracked location of the target within the image/video (processing block 710). In one embodiment, the continuous tracking of the target object within a video enables the location that semantically relevant data is displayed in a video to be refreshed relative to a change in location of the target within the video. Thus, the semantically relevant data continuously appears in the correct location, with respect to the corresponding target object, within the digital video.

Figure 8:
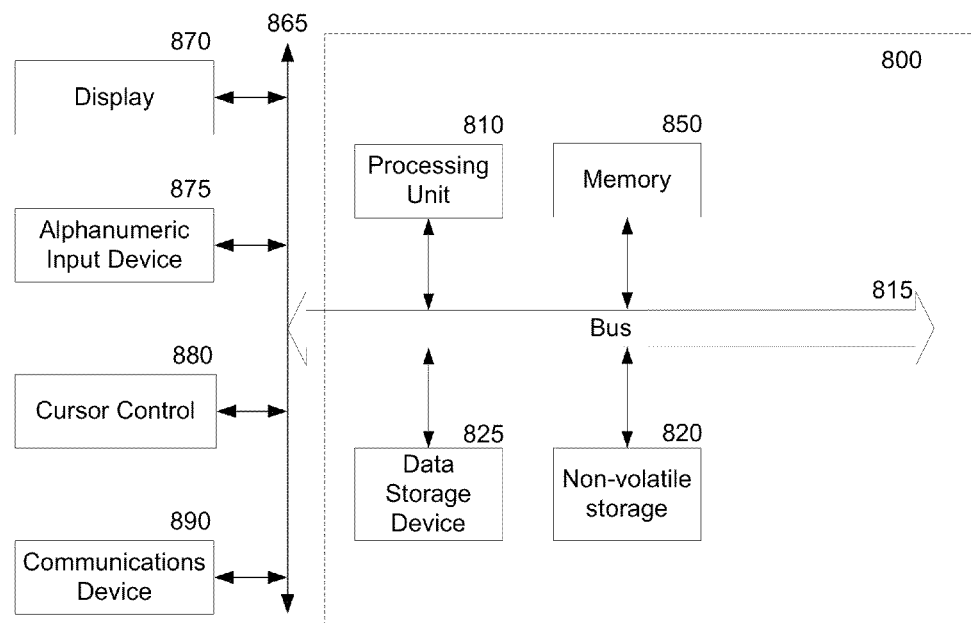
FIG. 8 illustrates a diagrammatic representation of a machine in the exemplary form of a computer system.

FIG. 8 is one embodiment of a computer system that may be used with the present invention. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a cathode ray tube (CRT) or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments of the present invention.

It will be appreciated by those of ordinary skill in the art that any configuration of the system may be used for various purposes according to the particular implementation. The control logic or software implementing the present invention can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The present invention may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of the present invention for such a device would be apparent to one of ordinary skill in the art given the disclosure of the present invention as provided herein.

The present invention may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

FIG. 9 illustrates an example system 900 for receiving, transmitting, and displaying semantically relevant data. The system 900 is shown in the form of a wearable computing device. While FIG. 9 illustrates eyeglasses 902 as an example of a wearable computing device, other types of wearable computing devices could additionally or alternatively be used. As illustrated in FIG. 9, the eyeglasses 902 comprise frame elements including lens-frames 904 and 906 and a center frame support 908, lens elements 910 and 912, and extending side-arms 914 and 916. The center frame support 908 and the extending side-arms 914 and 916 are configured to secure the eyeglasses 902 to a user's face via a user's nose and ears, respectively. Each of the frame elements 904, 906, and 908 and the extending side-arms 914 and 916 may be formed of a solid structure of plastic or metal, or may be formed of a hollow structure of similar material so as to allow wiring and component interconnects to be internally routed through the eyeglasses 902. Each of the lens elements 910 and 912 may be formed of any material that can suitably display a projected image or graphic. Each of the lens elements 910 and 912 may also be sufficiently transparent to allow a user to see through the lens element. Combining these two features of the lens elements can facilitate an augmented reality or heads-up display where the projected image or graphic is superimposed over a real-world view as perceived by the user through the lens elements.

The extending side-arms 914 and 916 are each projections that extend away from the frame elements 904 and 906, respectively, and are positioned behind a user's ears to secure the eyeglasses 902 to the user. The extending side-arms 914 and 916 may further secure the eyeglasses 902 to the user by extending around a rear portion of the user's head. Additionally or alternatively, for example, the system 100 may connect to or be affixed within a head-mounted helmet structure. Other possibilities exist as well.

The system 900 may also include an on-board computing system 918, a video camera 920, a sensor 922, and finger-operable touch pads 924, 926. The on-board computing system 918 is shown to be positioned on the extending side-arm 914 of the eyeglasses 902; however, the on-board computing system 918 may be provided on other parts of the eyeglasses 902. The on-board computing system 918 may include a processor and memory, for example. The on-board computing system 918 may be configured to receive and analyze data from the video camera 920 and the finger-operable touch pads 924, 926 (and possibly from other sensory devices, user interfaces, or both) and generate images for output from the lens elements 910 and 912. The video camera 920 is shown to be positioned on the extending side-arm 914 of the eyeglasses 902; however, the video camera 920 may be provided on other parts of the eyeglasses 902. The video camera 920 may be configured to capture images at various resolutions or at different frame rates. Many video cameras with a small form-factor, such as those used in cell phones or webcams, for example, may be incorporated into an example of the system 900. Although FIG. 9 illustrates one video camera 920, more video cameras may be used, and each may be configured to capture the same view, or to capture different views. For example, the video camera 920 may be forward facing to capture at least a portion of the real-world view perceived by the user. This forward facing image captured by the video camera 920 may then be used to generate an augmented reality where computer generated images appear to interact with the real-world view perceived by the user.

The sensor 922 is shown mounted on the extending side-arm 916 of the eyeglasses 902; however, the sensor 922 may be provided on other parts of the eyeglasses 902. The sensor 922 may include one or more of a gyroscope or an accelerometer, for example. Other sensing devices may be included within the sensor 922 or other sensing functions may be performed by the sensor 922. The finger-operable touch pads 924, 926 are shown mounted on the extending side-arms 914, 916 of the eyeglasses 902. Each of finger-operable touch pads 924, 926 may be used by a user to input commands. The finger-operable touch pads 924, 926 may sense at least one of a position and a movement of a finger via capacitive sensing, resistance sensing, or a surface acoustic wave process, among other possibilities. The finger-operable touch pads 924, 926 may be capable of sensing finger movement in a direction parallel or planar to the pad surface, in a direction normal to the pad surface, or both, and may also be capable of sensing a level of pressure applied. The finger-operable touch pads 924, 926 may be formed of one or more translucent or transparent insulating layers and one or more translucent or transparent conducting layers. Edges of the finger-operable touch pads 924, 926 may be formed to have a raised, indented, or roughened surface, so as to provide tactile feedback to a user when the user's finger reaches the edge of the finger-operable touch pads 924, 926. Each of the finger-operable touch pads 924, 926 may be operated independently, and may provide a different function.

FIG. 10 illustrates an alternate view of the system 900 of FIG. 9. As shown in FIG. 10, the lens elements 1010 and 1012 may act as display elements. The eyeglasses 1002 may include a first projector 1028 coupled to an inside surface of the extending side-arm 1016 and configured to project a display 1030 onto an inside surface of the lens element 1012.

Additionally or alternatively, a second projector 1032 may be coupled to an inside surface of the extending sidearm 1014 and configured to project a display 1034 onto an inside surface of the lens element 1010. The lens elements 1010 and 1012 may act as a combiner in a light projection system and may include a coating that reflects the light projected onto them from the projectors 1028 and 1032.

In some embodiments, a special coating may not be used (e.g., when the projectors 1028 and 1032 are scanning laser devices). In alternative embodiments, other types of display elements may also be used. For example, the lens elements 1010, 1012 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 1004 and 1006 for driving such a matrix display. Alternatively or additionally, a laser or LED source and scanning system could be used to draw a raster display directly onto the retina of one or more of the user's eyes. Other possibilities exist as well.

Figure 11:
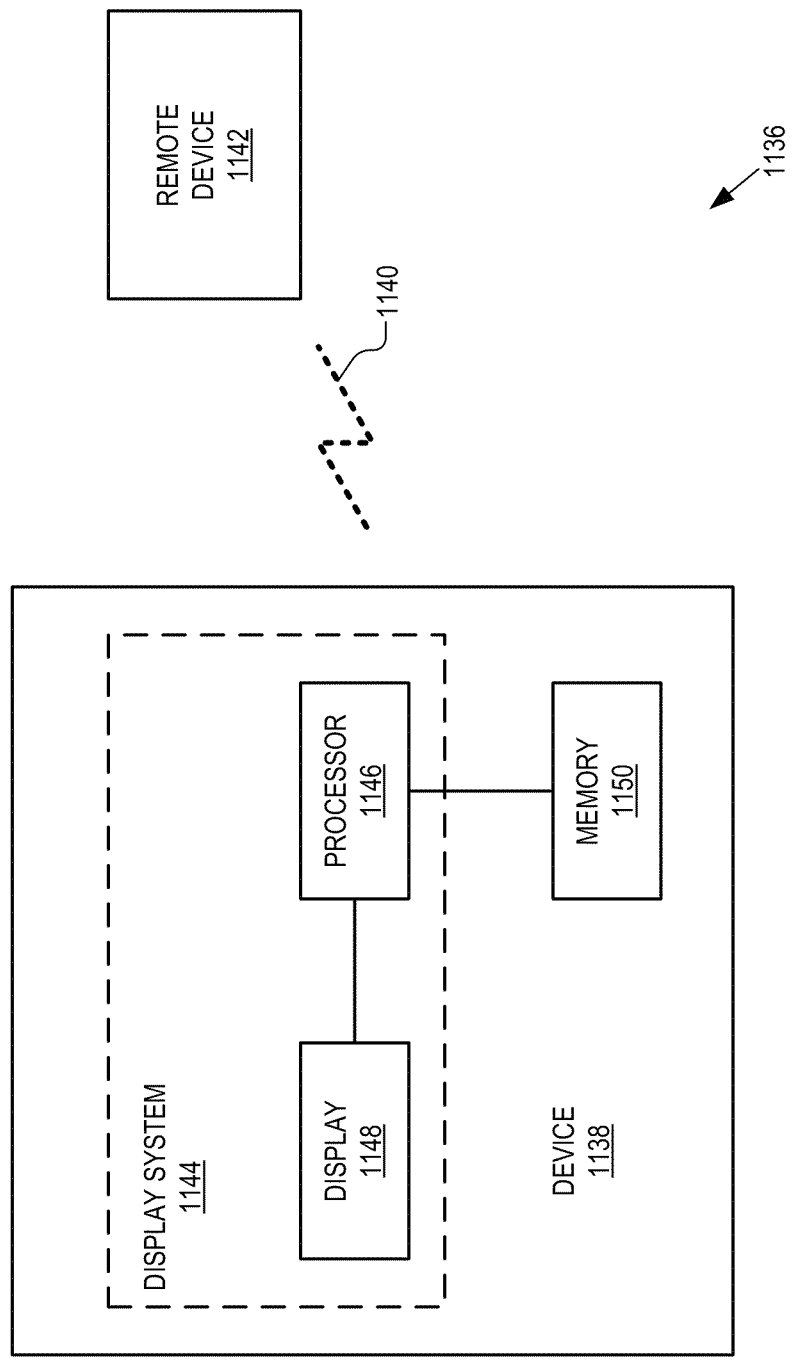
FIG. 11 illustrates an example schematic drawing of a computer network infrastructure.

FIG. 11 illustrates an example schematic drawing of a computer network infrastructure. In one system 1136, a device 1138 communicates using a communication link 1140 (e.g., a wired or wireless connection) to a remote device 1142. The device 1138 may be any type of device that can receive data and display information corresponding to or associated with the data. For example, the device 1138 may be a heads-up display system, such as the eyeglasses 902 and 1002 described with reference to FIGS. 9 and 10. Thus, the device 1138 may include a display system 1144 comprising a processor 1146 and a display 1148. The display 1148 may be, for example, an optical see-through display, an optical see-around display, or a video see-through display. The processor 1146 may receive data from the remote device 1142, and configure the data for display on the display 1148. The processor 1146 may be any type of processor, such as a microprocessor or a digital signal processor, for example. The device 1138 may further include on-board data storage, such as memory 1150 coupled to the processor 1146. The memory 1150 may store software that can be accessed and executed by the processor 1146, for example.

The remote device 1142 may be any type of computing device or transmitter including a laptop computer, a mobile telephone, etc., that is configured to transmit data to the device 1138. The remote device 1142 and the device 1038 may contain hardware to enable the communication link 1140, such as processors, transmitters, receivers, antennas, etc.

In FIG. 11, the communication link 1140 is illustrated as a wireless connection; however, wired connections may also be used. For example, the communication link 1140 may be a wired link via a serial bus such as a universal serial bus or a parallel bus. A wired connection may be a proprietary connection as well. The communication link 1140 may also be a wireless connection using, e.g., Bluetooth® radio technology, communication protocols described in IEEE 802.11 (including any IEEE 802.11 revisions), Cellular technology (such as GSM, CDMA, UMTS, EVDO, WiMAX, or LTE), or Zigbee® technology, among other possibilities. The remote device 1142 may be accessible via the Internet and may comprise a computing cluster associated with a particular web service (e.g., social-networking, photo sharing, address book, etc.).

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

We claim:

1. A computer-implemented method, comprising:
 receiving, at a server computer system, digital image data captured by a mobile device;
 performing image recognition analysis on an object within the digital image data to identify the object;
 receiving, at the server computer system, sensor data that describes a change in orientation executed by the user device;
 determining based on the identity of the object, the image analysis, and the sensor data, a gesture associated with the object;
 querying a semantic associations database based on the determined gesture and the object to determine a secondary meaning associated with the gesture and the object, wherein the secondary meaning is a non-literal meaning associated with the determined identity of the object based on the gesture, wherein the non-literal meaning is inferred from descriptions associated with a plurality of images located on a computer network that depict objects with the determined identity, wherein the descriptions each include one or more references to the non-literal meaning associated with the gesture;
 in response to the determination of the secondary meaning, requesting augmentation data from a remote service based on the secondary meaning;
 receiving the augmentation data from the remote service in response to the request, wherein the augmentation data is relevant to the secondary meaning associated with the identified object, and wherein the augmentation data is to be rendered over the identified object in the digital image data when displayed by the mobile device; and
 transmitting augmentation data to the mobile device that is semantically relevant to the object based on the secondary meaning.

2. The computer-implemented method of claim 1, further comprising:
 receiving metadata with the digital image data, the metadata captured by one or more sensors of the mobile device;
 including the received metadata in the request of the remote system, the metadata to provide a context for the request.

3. The computer implemented method of claim 1, wherein the querying further comprises:
 consulting a translation table that associates objects with one or more secondary meanings.

4. The computer implemented method of claim 1, wherein the mobile device is a user-wearable computing device in the form of eyeglasses to render the augmentation data over a user's view of the object.

5. The computer implemented method of claim 4, wherein the digital image data is a live video feed.

6. The computer-implemented method of claim 1, wherein the object in the digital image is an image of a sky, and the secondary meaning indicates a user request to obtain current weather condition data.

7. A non-transitory computer readable storage medium including instructions that, when executed by a processor, cause the processor to perform a method comprising:
receiving digital image data captured by a mobile device;
performing image recognition analysis on an object within the digital image data to identify the object;
receiving sensor data that describes a change in orientation executed b the user device;
determining based on the identity of the object, the image analysis, and the sensor data, a gesture associated with the object;
querying a semantic associations database based on the determined gesture and the object to determine a secondary meaning associated with the gesture and the object, wherein the secondary meaning is a non-literal meaning associated with the determined identity of the object based on the gesture, wherein the non-literal meaning is inferred from descriptions associated with a plurality of images located on a computer network that depict objects with the determined identity, wherein the descriptions each include one or more references to the non-literal meaning associated with the gesture;
in response to the determination of the secondary meaning, requesting augmentation data from a remote service based on the secondary meaning;
receiving the augmentation data from the remote service in response to the request, wherein the augmentation data is relevant to the secondary meaning associated with the identified object, and wherein the augmentation data is to be rendered over the identified object in the digital image data when displayed by the mobile device; and
transmitting augmentation data to the mobile device that is semantically relevant to the object based on the secondary meaning.

8. The computer readable storage medium of claim 7, further comprising:
receiving metadata with the digital image data, the metadata captured by one or more sensors of the mobile device;
including the received metadata in the request of the remote system, the metadata to provide a context for the request.

9. The computer readable storage medium of claim 7, wherein the querying further comprises:
consulting a translation table that associates objects with one or more secondary meanings.

10. The computer readable storage medium of claim 7, wherein the mobile device is a user-wearable computing device in the form of eyeglasses to render the augmentation data over a user's view of the object.

11. The computer readable storage medium of claim 10, wherein the digital image data is a live video feed.

12. The computer readable storage medium of claim 7, wherein the object in the digital image is an image of a sky, and the secondary meaning indicates a user request to obtain current weather condition data.

13. A system comprising:
a memory; and
a processor coupled with the memory to receive digital image data captured by a mobile device;
perform image recognition analysis on an object within the digital image data to identify the object;
receive sensor data that describes a change in orientation executed by the user device;
determine, based on the identity of the object, the image analysis, and the sensor data, a gesture associated with the object;
query a semantic associations database based on the determined gesture and the object to determine a secondary meaning associated with the gesture and the object, wherein the secondary meaning is a non-literal meaning associated with the determined identity of the object based on the gesture, wherein the non-literal meaning is inferred from descriptions associated with a plurality of images located on a computer network that depict objects with the determined identity, wherein the descriptions each include one or more references to the non-literal meaning associated with the gesture;
in response to the determination of the secondary meaning, request augmentation data from a remote service based on the secondary meaning, receive the augmentation data from the remote service in response to the request, wherein the augmentation data is relevant to the secondary meaning associated with the identified object, and wherein the augmentation data is to be rendered over the identified object in the digital image data when displayed by the mobile device, and
transmit display data to the mobile device that is semantically relevant to the object based on the secondary meaning.

14. The computer-implemented method of claim 2, wherein the one or more sensors comprise one or more accelerometers, and wherein the context for the request provided from the metadata comprises at least an orientation of the mobile device when the digital image data was captured, wherein the orientation is utilized to select between different potential secondary meanings associated with the determined identity of the object.

* * * * *